(12) United States Patent
Wang

(10) Patent No.: US 8,743,987 B2
(45) Date of Patent: Jun. 3, 2014

(54) SYMBOL DETECTION FOR ALLEVIATING INTER-SYMBOL INTERFERENCE

(75) Inventor: Yi-Pin Eric Wang, Fremont, CA (US)

(73) Assignee: Optis Cellular Technology, LLC, Plano, TX (US)

( * ) Notice: Subject to any disclaimer, the term of this patent is extended or adjusted under 35 U.S.C. 154(b) by 421 days.

(21) Appl. No.: 13/050,210

(22) Filed: Mar. 17, 2011

(65) Prior Publication Data

US 2012/0051416 A1    Mar. 1, 2012

Related U.S. Application Data

(60) Provisional application No. 61/378,556, filed on Aug. 31, 2010.

(51) Int. Cl.
*H04L 27/06* (2006.01)
*H04L 27/01* (2006.01)
*H04B 1/10* (2006.01)

(52) U.S. Cl.
USPC .......................................... 375/267; 375/340

(58) Field of Classification Search
USPC .......... 375/340, 341, 260, 262, 267, 316, 347
See application file for complete search history.

(56) References Cited

U.S. PATENT DOCUMENTS

| 5,757,791 | A | 5/1998 | Kanterakis et al. | |
| 8,351,549 | B1 | 1/2013 | Choi et al. | |
| 2006/0203932 | A1* | 9/2006 | Palanki et al. | 375/295 |
| 2007/0071075 | A1* | 3/2007 | Yang et al. | 375/150 |
| 2008/0279298 | A1* | 11/2008 | Ben-Yishai et al. | 375/261 |
| 2008/0298491 | A1* | 12/2008 | Jung et al. | 375/260 |
| 2009/0034664 | A1 | 2/2009 | Masui et al. | |
| 2009/0046772 | A1* | 2/2009 | Yu et al. | 375/229 |
| 2009/0135964 | A1 | 5/2009 | Bahng et al. | |
| 2010/0103983 | A1* | 4/2010 | Wang et al. | 375/141 |
| 2010/0166119 | A1 | 7/2010 | Wang et al. | |
| 2011/0075767 | A1 | 3/2011 | Bottomley et al. | |
| 2011/0090893 | A1 | 4/2011 | Higuchi et al. | |
| 2011/0129042 | A1 | 6/2011 | Grant et al. | |
| 2011/0129043 | A1 | 6/2011 | Grant et al. | |
| 2011/0176622 | A1* | 7/2011 | Higashinaka et al. | 375/259 |

FOREIGN PATENT DOCUMENTS

| GB | 2 472 906 A | 2/2011 |
| WO | 2008/027554 A2 | 3/2008 |

OTHER PUBLICATIONS

K. Kambara, H. Nishimoto, T. Nishimura, Y. Ogawa, and T. Ohgane, Subblock Processing for MMSE-FDE Under Fast Fading Environments, Hokkaido University, Japan, IEEE, 2007.*

K. Kambara, H. Nishimoto, T. Nishimura, Y. Ogawa, and T. Ohgane, Subblock Processing for Frequency-Domain Turbo Equalization Under Fast Fading Environments, Hokkaido University, Japan, IEEE, 2007.*

(Continued)

*Primary Examiner* — Aristocratis Fotakis
(74) *Attorney, Agent, or Firm* — Vincent J. Allen; Carstens & Cahoon, LLP

(57) ABSTRACT

A receiver is configured to perform symbol detection based on a total frequency domain received signal that comprises contribution from a block of time domain symbols. The receiver comprises electronic circuitry operate to divide the block into plural sub-blocks, and for each sub-block, to jointly detect the symbols of the sub-block while treating symbols of the block which are outside of the sub-block as noise.

19 Claims, 10 Drawing Sheets

(56) References Cited

OTHER PUBLICATIONS

Dai et al, "A Comparative Study of QRD-M Detection and Sphere Decoding for MIMO-OFDM Systems", 2005 IEEE 16th International Symposium on Personal, Indoor and Mobile Radio Communications, 2005, Berlin Germany, Sep. 11-14, 2005, Piscataway, NJ, vol. 1, Sep. 11, 2005, pp. 186-190.

Kimura et al, "Multiple-QR-Decomposition Assisted Group Detection for Reduced-Complexity-and-Latency MIMO-OFDM Receivers", The 17th Annual IEEE International Symposium on Personal, Indoor and Mobile Radio Communications (PIMRC'06), Sep. 1, 2006, pp. 1-5.

Radosavljevic et al, "QRD-QLD Searching Based Sphere Detection for Emerging MIMO Downlink OFDN Receivers", 2008 Global Telecommunications Conference, IEEE GLOBECOM 2008, Piscataway, NJ, Nov. 30, 2008, pp. 1-5.

International Search Report and Written Opinion mailed Dec. 19, 2011 in PCT Application No. PCT/IB2011/053801.

International Search Report and Written Opinion mailed Dec. 27, 2011 in PCT Application No. PCT/IB2011/053798.

International Search Report and Written Opinion mailed Jan. 12, 2012 in PCT Application No. PCT/I2011/053799.

Sari et al, "Frequency-domain equalization of mobile radio and terrestrial broadcast channels" in Proc. IEEE Global Telecommun. Conf., vol. 1, Nov. 1994.

Bottomomley et al, "Subblock Equalization and Code Averaging for DS-CMDA Receivers", IEEE Transactions on Vehicular Technology, vol. 59, No. 7, Sep. 2010, pp. 3321-3331.

Berardinelli et al, "Improving SC-FDMA performance by turbo equalization in UTRA LTE uplink" in Proc. IEEE Veh. Technol. Conf. (VTC), Singapore, May 11-14, 2008, pp. 2557-256.

U.S. Appl. No. 13/050,210, filed Mar. 17, 2011, entitled "Symbol Detection for alleviating inter-symbol interference".

U.S. Appl. No. 13/050,433, filed Mar. 17, 2011, entitled "Frequency-Domain Multi-Stage Group Detection for alleviating inter-symbol interference".

U.S. Appl. No. 13/050,697, filed Mar. 17, 2011, entitled "incrementally inclusive frequency domain symbol joint detection".

Riskin, "Optimal bit allocation via the generalized BFOS algorithm," IEEE Trans, Info Thy., vol. 37, pp. 400-402, Mar. 1991.

Soderstrom et al, System Identification, Prentice Hall, 1989.

Choi et al., "Efficient Soft-Input Soft-Output MIMO Detection Via Improved M-Algorithm", Proceedings of 2010 IEEE International Conference on Communications.

Baek et al., "Combined QRD-M and DFE Detection Technique for Simple and Efficient Signal Detection in MIMO-OFDM Systems", IEEE Transactions on Wireless Communications, vol. 8, No. 4, Apr. 2009; pp. 1632-1638.

Jelinek et al., "Instrumental Tree Encoding of Information Sources", IEEE Transactions on Information Theory, Jan. 1971, pp. 118-119.

Anderson et al., "Sequential Coding Algorithms: A Survey and Cost Analysis", IEEE Transactions on Communications, vol. COM-32, No. 2, Feb. 1984, pp. 169-176.

Notice of Allowance mailed Jun. 10, 2013 in U.S. Appl. No. 13/050,697.

Notice of Allowance mailed May 9, 2013 in U.S. Appl. No. 13/050,433.

\* cited by examiner

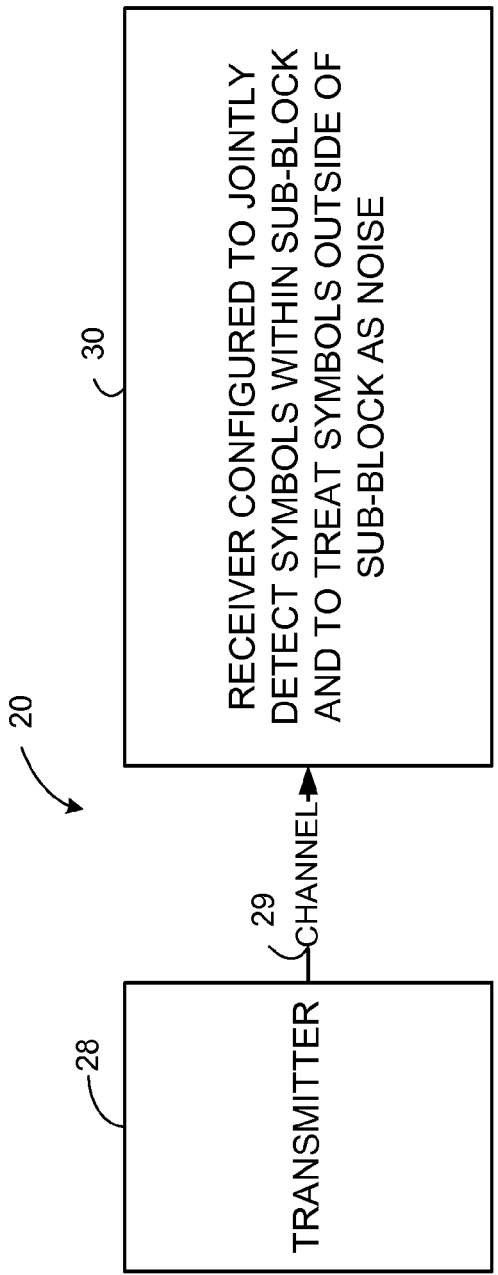
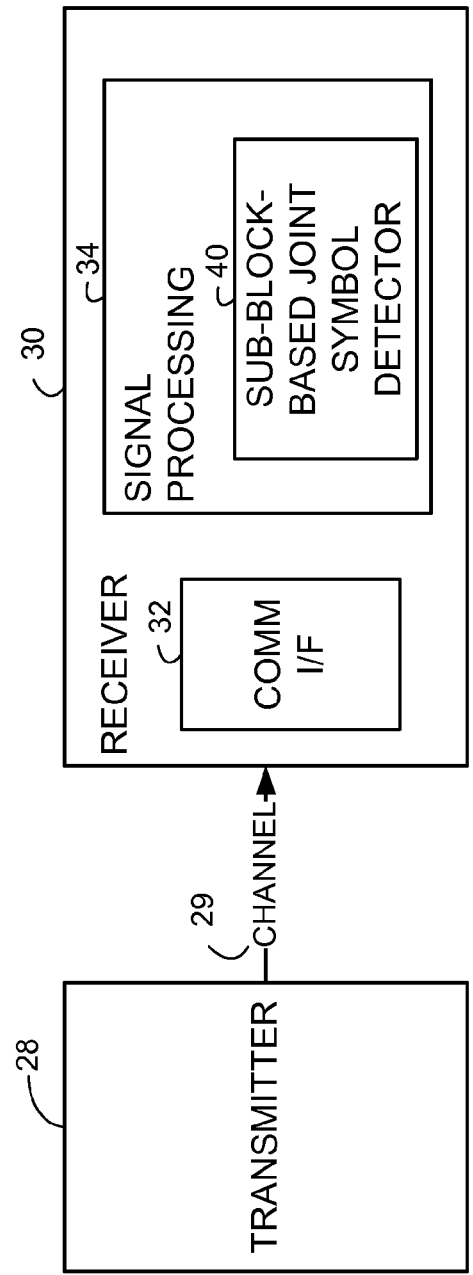

SYMBOL DETECTION FOR ALLEVIATING INTER-SYMBOL INTERFERENCE

This application claims the priority and benefit of U.S. Provisional Patent application 61/378,556, filed Aug. 31, 2010, entitled Frequency-Domain Subblock Equalization for Uplink LTE to Alleviate Inter-Symbol Interference", which is incorporated herein by reference in its entirety.

This application is related to U.S. patent application Ser. No. 13/050,433, filed on even date herewith, entitled "FREQUENCY-DOMAIN MULTI-STAGE GROUP DETECTION FOR ALLEVIATING INTER-SYMBOL INTERFERENCE", which is incorporated herein by reference in its entirety.

This application is related to U.S. patent application Ser. No. 13/050,697, filed on even date herewith, entitled "INCREMENTALLY INCLUSIVE FREQUENCY DOMAIN SYMBOL JOINT DETECTION", which is incorporated herein by reference in its entirety.

TECHNICAL FIELD

This invention pertains to telecommunications, and particularly to detection of symbols transmitted over a radio channel.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB in LTE) and AGWs. As such, the radio access network (RAN) of an LTE system has an essentially "flat" architecture comprising radio base station nodes without reporting to radio network controller (RNC) nodes.

Long Term Evolution (LTE) uses single-carrier frequency-division multiple access (SC-FDMA) in an uplink direction from the wireless terminal to the eNodeB. SC-FDMA is advantageous in terms of power amplifier (PA) efficiency since, e.g., the SC-FDMA signal has a smaller peak-to-average ratio than an orthogonal frequency division multiple access (OFDM) signal. However, SC-FDMA gives rise to inter-symbol interference (ISI) problem in dispersive channels. Addressing inter-symbol interference (ISI) can enable SC-FDMA to improve power amplifier efficiency without sacrificing performance.

Frequency-domain (FD) linear equalization (LE) is commonly used in the LTE uplink to deal with inter-symbol interference (ISI). In frequency domain linear equalization, inter-symbol interference (ISI) is modeled as colored noise, which is then suppressed by the linear equalization. A popular linear equalization approach is linear minimum mean square error (LMMSE) equalization. Linear minimum mean square error (LMMSE) equalization is described, e.g., by H. Sari, G. Karam, and I. Jeanclaude, "Frequency-domain equalization of mobile radio and terrestrial broadcast channels," in Proc. IEEE Global Telecommun. Conf., vol. 1, November 1994, which is incorporated herein by reference in its entirety. However, performance of LMMSE equalization is limited. When the allocated bandwidth is large and when the channel is highly dispersive, a more sophisticated receiver is needed in order to ensure robust reception.

Soft cancellation-based MMSE turbo equalization has been considered for use on the uplink in LTE. With a receiver using soft cancellation-based MMSE turbo equalization, inter-symbol interference (ISI) is cancelled via soft decision-feedback equalization (DFE), where the tentatively detected soft symbols are determined based on turbo decoder outputs. The performance of such a receiver improves when more information exchanges between the decoder and soft DFE/demodulator take place. Although turbo equalization achieves superior performance, it incurs a large latency due to the iterative demodulation and decoding process.

Maximum-likelihood detection (MLD) is a well-known approach to address the inter-symbol interference (ISI) and multiple input/multiple output (MIMO) interference. Maximum-likelihood detection (MLD) does not involve the decoder cooperation and thus does not incur as a long latency as turbo equalization does. However, when there are too many overlapping symbols, Maximum-likelihood detection (MLD) becomes impractical due to complexity.

SUMMARY

In one of its aspects the technology disclosed herein concerns a receiver configured to perform symbol detection based on a total frequency domain received signal that comprises contribution from a block of time domain symbols. The receiver is configured to divide the block into plural sub-blocks, and for each sub-block to jointly detect the symbols of the sub-block while treating symbols of the block which are outside of the sub-block as noise.

In an example embodiment the receiver comprises a plurality of receive antennas and an electronic circuit. The plurality of receive antennas are operable to receive a frequency domain signal comprising a block of time domain symbols. The electronic circuitry is operable to divide the block of time domain symbols in the received signal into plural sub-blocks; and, for each sub-block, to jointly detect the symbols of the sub-block while treating symbols of the block which are outside of the sub-block as noise.

In an example embodiment the receiver comprises a base station and the plural receive antennas are configured to receive the frequency domain signal on an uplink channel.

In an example embodiment the uplink channel is at least one of a Physical Uplink Shared Channel (PUSCH) and a Physical Uplink Control Channel (PUCCH).

In an example embodiment the electronic circuitry serves, e.g., as a symbol detector and is further operable to use properties related to symbols of the block that are outside of the sub-block for generating combining weights and configured to use the combining weights for combining plural versions of the received signal at each subcarrier, each version received from a respective one of the plural receive antennas. In an example embodiment, the properties related to the symbols of the block that are outside of the sub-block comprises frequency characteristics and spatial correlation of the symbols of the block that are outside of the sub-block.

In an example embodiment electronic circuitry is further operable to generate plural joint hypotheses for the time domain symbols in the sub-block. The electronic circuitry is also operable to perform an evaluation of a decision metric for each of the plural joint hypotheses and to detect correct symbols based on the evaluation of the decision metric.

In an example embodiment the detection metric is a function of a frequency domain equalized signal and/or a time domain equalized signal.

In an example embodiment the electronic circuitry is further operable to determine, separately, for each subcarrier of the block, a combining weight that is applicable for all sub-blocks of the block; and, for each subcarrier of the sub-block, to use the combining weight for performing the evaluation of the decision metric.

In an example embodiment the electronic circuitry is further operable to determine, prior to performing the evaluation, common waveform cross-correlation terms that are common for performing the evaluation of the decision metric for different sub-blocks; and to use the common waveform cross-correlation terms when performing the evaluation of the decision metric for the plural joint hypotheses.

In an example embodiment, the electronic circuitry is further operable to perform a cyclical shift of the waveform cross-correlation terms and to use the cyclical shift of the waveform cross-correlation terms to perform the evaluation of the decision metric for the plural joint hypotheses.

In another of its aspects the technology disclosed herein concerns a method of operating a wireless receiver. In an example embodiment and mode the method comprises receiving a total frequency domain received signal that comprises contribution from a block of time domain symbols; dividing the block of time domain symbols into plural sub-blocks; and for each sub-block jointly detecting the symbols of the sub-block while treating symbols of the block which are outside of the sub-block as noise.

In an example embodiment and mode, the method further comprises transmitting the block on an uplink channel from a wireless terminal to a base station node.

In an example embodiment and mode, the method further comprises transmitting the block on at least one of a Physical Uplink Shared Channel (PUSCH) and a Physical Uplink Control Channel (PUCCH).

In an example embodiment and mode, the method further comprises using properties related to symbols of the block that are outside of the sub-block for generating combining weights; and using the combining weights for combining plural versions of the signal of each subcarrier received from respective plural receive antennas. In an example embodiment and mode, the properties related to the symbols of the block that are outside of the sub-block comprise frequency characteristics and spatial correlation of the symbols of the block that are outside of the sub-block.

In an example embodiment and mode, the method further comprises, for each sub-block: generating plural joint hypotheses for the time domain symbols of in the sub-block; performing an evaluation of a decision metric for each of the plural joint hypotheses; and, detecting correct symbols based on the evaluation of the decision metric.

In an example embodiment and mode, the method further comprises configuring the detection metric as a function of a frequency domain equalized signal and/or a time domain equalized signal.

In an example embodiment and mode, the method further comprises determining separately for each subcarrier of the block a combining weight that is applicable for all sub-blocks of the block; and, for each subcarrier using the combining weight for performing the evaluation of the decision metric.

In an example embodiment and mode, the method further comprises using the combining weight to combine copies of the signals from plural receive antenna.

In an example embodiment and mode, the method further comprises, prior to performing the evaluation, determining common waveform cross-correlation terms that are common for performing the evaluation of the decision metric for different sub-blocks; and using the common waveform cross-correlation terms when performing the evaluation of the decision metric for the plural joint hypotheses.

In an example embodiment and mode, the method further comprises performing a cyclical shift of the common waveform cross-correlation terms; and using the cyclical shift of the common waveform cross-correlation terms when performing the evaluation of the decision metric for the plural joint hypotheses.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a diagrammatic view of portions of a telecommunications network according to an example embodiment.

FIG. 3 is a diagrammatic view of portions of a telecommunications network according to an example embodiment showing selected basic functionalities of a receiver.

DETAILED DESCRIPTION

Figure 2:
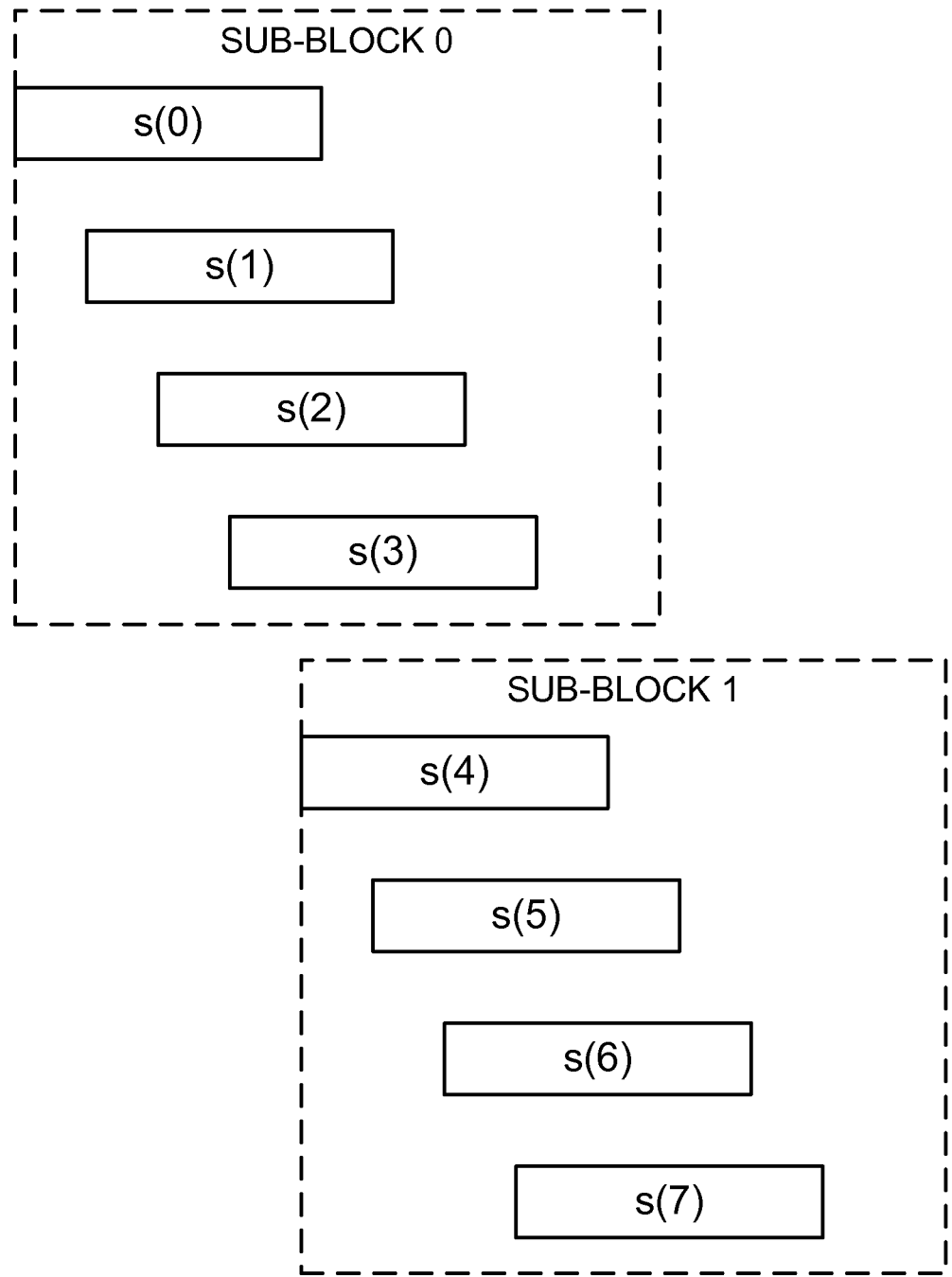
FIG. 2 is a diagrammatic view illustrating division of a block into sub-blocks according to an example embodiment and mode.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows portions of a telecommunications network 20, and particularly a telecommunications network 20 comprising a transmitter 28 that communicates over a channel 29, e.g., an air interface, with a wireless receiver 30. The transmitter 28 is of a type that modulates a block of symbols onto plural radio frequency subcarriers for transmission as a signal over the channel 29. As explained in more detail subsequently, as part of its signal processing the receiver 30 divides the block received from the transmitter into sub-blocks (as simply illustrated in FIG. 2), and for each sub-block jointly detects symbols within the sub-block while treating the symbols outside the sub-block as noise.

The wireless receiver 30 described herein can be any device that receives transmissions over an air interface. In some example, non-limiting embodiments, the wireless receiver 30 may take the form of a radio base station node of a radio access network, which (in LTE parlance) may also have the name of an eNodeB or eNB. Moreover, in some example, non-limiting embodiments and modes the blocks described herein may comprise information transmitted on an uplink from a wireless device such as a user equipment unit (UE) to a base station node, and particularly information transmitted over an uplink channel such as, for example, at least one of a Physical Uplink Shared Channel (PUSCH) and a Physical Uplink Control Channel (PUCCH).

FIG. 3 shows basic functionalities of a wireless receiver according to an example embodiment. The wireless receiver of FIG. 3 comprises communication interface 32 and signal processing section 34. In an example embodiment the signal processing section 34 may be realized by an electronic circuit or platform as herein described, e.g., with reference to FIG. 10. The electronic circuit serves as, e.g., or is comprised of, symbol detector 40. In the embodiment of FIG. 3 it is the symbol detector 40 of the signal processing section 34 that serves to divide the block received from the transmitter into sub-blocks (e.g., in the manner of FIG. 2), and for each sub-block jointly detects symbols with the sub-block while treating the symbols outside the sub-block as noise. The symbol detector 40 is thus also known as a sub-block-based joint symbol detector in view of its advantageous joint detection of symbols on a sub-block basis.

Thus, in an example embodiment the electronic circuit which serves as the symbol detector 40 is operable to divide the block of time domain symbols in the received signal into plural sub-blocks; and for each sub-block, jointly detect the symbols of the sub-block while treating symbols of the block that are outside of the sub-block as noise.

Figure 4:
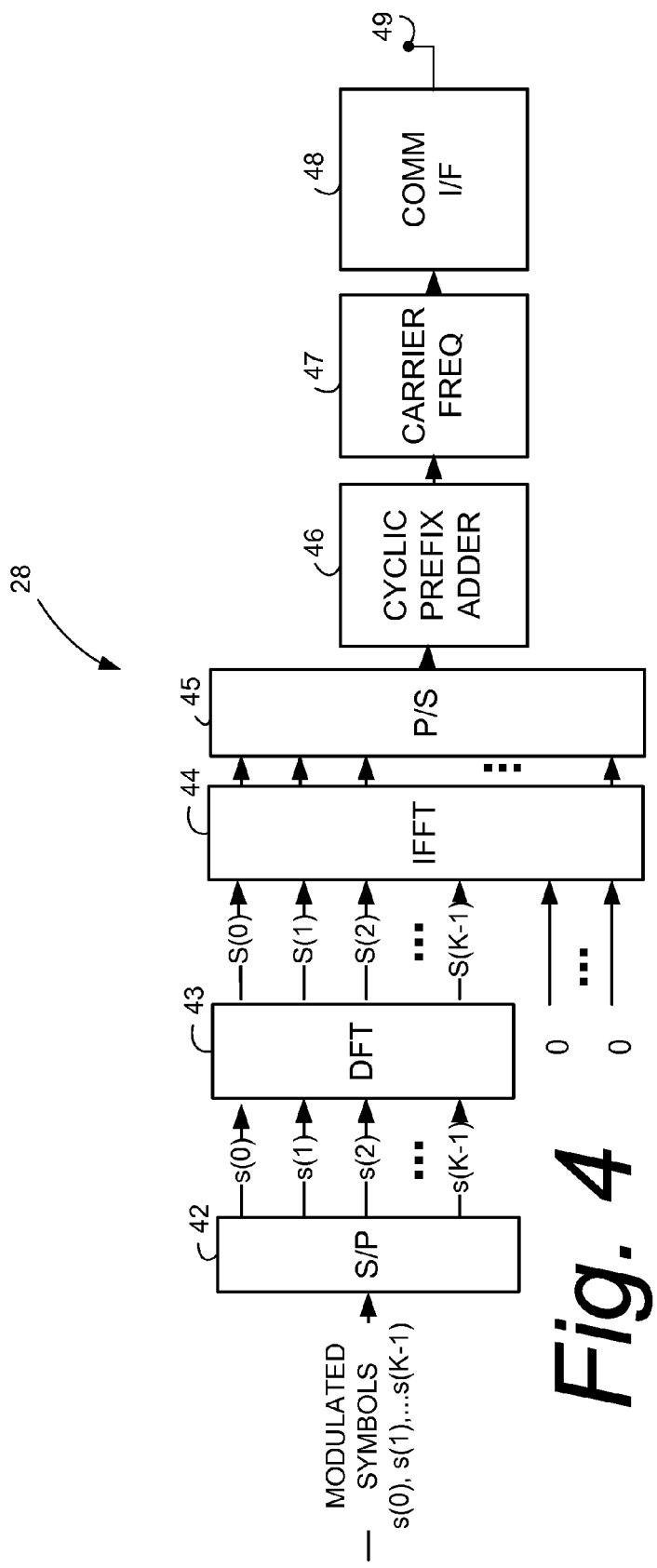
FIG. 4 is a schematic view of selected basic functionalities of a transmitter according to an example embodiment.

Advantages in jointly detecting symbols on a sub-block basis are especially appreciated when viewed in light of the nature of the signal transmitted by transmitter 28 over the channel 29. FIG. 4 shows more details of an example transmitter 28 that is suitable use with Long Term Evolution (LTE). The FIG. 4 transmitter 28 comprises serial-to-parallel converter 42; discrete Fourier transformation section 43; modulation section 44; parallel-to-serial converter 45; cyclic prefix adder 46; carrier frequency shifter 47; and communication interface 48.

FIG. 4 further shows a serial stream of modulated time domain symbols s(0), s(1), ... s(K−1) incoming to transmitter 28 being converted to parallel symbols s(0), s(1), ... s(K−1) by serial-to-parallel converter 42. The parallel time domain symbols s(0), s(1), ... s(K−1) are applied to input ports of discrete Fourier transformation section 43 that performs a conversion to the frequency domain. For example, time-domain symbols s(0), s(1), ..., s(K−1) are precoded via a discrete Fourier transform (DFT) 43 to produce K number of frequency-domain symbols according to Expression 1.

$$S(k) = \frac{1}{\sqrt{K}} \sum_{i=0}^{K-1} s(i) e^{\frac{-j2\pi ik}{K}}, 0 \le k \le K-1 \quad \text{Expression 1}$$

$$S = Fs \quad \text{Expression 2}$$

Expression 2 above shows a vector representation of the frequency domain symbols, where $S=(S(0), S(1), \ldots, S(K-1))^T$, $s=(s(0), s(1), \ldots, s(K-1))^T$, K is the size of the DFT, and the (k,i) component of matrix F is $$f_{ki} = \frac{e^{\frac{-j2\pi ik}{K}}}{\sqrt{K}}.$$

Herein it is assumed the symbol energy is normalized to have unity average symbol energy, $E[|s(k)|^2]=E[|S(k)|^2]=1$ Each of the time-domain symbols is generated according to a modulation scheme used by the transmitter 28. A modulation scheme can for example be QPSK, which has four constellation points, 16-QAM, which has 16 constellation points, or 64-QAM, which has 64 constellation points. The frequency-domain symbols S(0), S(1), ... S(K−1) output from discrete Fourier transform (DFT) 43 are applied to an Inverse Fast Fourier Transformer (IFFT) modulation section 44. Each frequency-domain symbol is modulated on a subcarrier allocated to the user of interest, as understood with reference to Expression 3.

$$x(t) = \sum_{k=0}^{K-1} S(k) e^{j2\pi(k-K_s)(t-t_{op})\Delta f} \quad \text{Expression 3}$$

In Expression 3, K is the number subcarriers allocated to a user (e.g., the "user of interest"), $t_{cp}$ is the duration of the cyclic prefix, $K_s$ is a frequency offset used to shift the baseband signal to have a center frequency at D.C., and, $\Delta f=15$ kHz. Thus x(t) can be thought of as a periodic signal with period $1/\Delta f$; however the transmitted signal is truncated to have a duration of $t_{cp}+1/\Delta f$. The baseband time-continuous signal x(t) (with $K_s=0$) can be generated by first generating a discrete-time series of samples $x_n=x(n\Delta t)$ over one signal period, $1/\Delta f$. Here, the time interval between two discrete samples is $\Delta t=1/\Delta f/N$, where integer N is chosen to achieve accurate representation of the time-continuous baseband signal x(t) through the discrete-time series of samples $\{x_n\}_{n=0}^{N-1}$. With a sufficiently large value of N, x(t) can be accurately generated through passing $\{x_n\}_{n=0}^{N-1}$ to a digital to analog (D/A) filter. A computationally efficient method of generating $\{x_n\}_{n=0}^{N-1}$ is to perform an N-point IFFT operation on the frequency domain symbols S(0), S(1), ... S(K−1). Typically, N>K, and in such cases S(k) is set to zero for k≥K, as illustrated in FIG. 4.

The outputs of IFFT 44 are then applied to parallel-to-serial (P/S) converter 45, which outputs the discrete-time series of samples $\{x_n\}_{n=0}^{N-1}$ to cyclic prefix adder 46. The stream with inserted cyclic prefix after D/A filtering is shifted to appropriate subcarrier frequency(ies) by carrier frequency shifter 47. That is, the carrier frequency shifter 47 shifts the baseband signal to a subcarrier frequency according to the band for the operation, and then to communication interface 48. As shown in FIG. 4, the communication interface 48 may comprise plural transmit antennas 49, as is common in a MIMO environment. In another embodiment, the entire transmitter 28 can be duplicated to support transmitting an additional stream or layer of data for a MIMO transmission, for example.

The transmitter 28 thus originally received K symbols in the time domain, but through, e.g., the DFT process, each frequency domain symbol becomes a function of these K time domain symbols. In time dispersion over the channel 29 these K time domain symbols may mingle together or interfere with each other to cause the inter-symbol interference (ISI) phenomena earlier mentioned.

The receiver 30 receives a received signal of duration $t_{cp}+1/\Delta f$ that includes a block of K number of symbols of interest, which is referred to as a symbol block or "block". There is one frequency domain symbol per subcarrier, but each time domain symbol which is being detected is spread of all K subcarriers. In view of the inter-symbol interference (ISI), the receiver 30 advantageously performs joint detection of symbols in the block. But the number K can be quite large, e.g., K=300 or so with a 5 MHz bandwidth allocation for a non-MIMO application, and can be much larger for a MIMO application. In view, e.g., of the large size of K, joint detection of all symbols of the block is much too complicated if not impossible. Therefore, the receiver 30 of the technology disclosed herein also advantageously divides the symbol block into plural sub-blocks. For example, FIG. 2 illustrates division of a symbol block into two sub-blocks, e.g., sub-block 0 and sub-block 1, wherein (for sake of simplified illustration) sub-block 0 comprises symbols s(0) through s(3) and sub-block 1 comprises s(4) through s(7).

Figure 5:
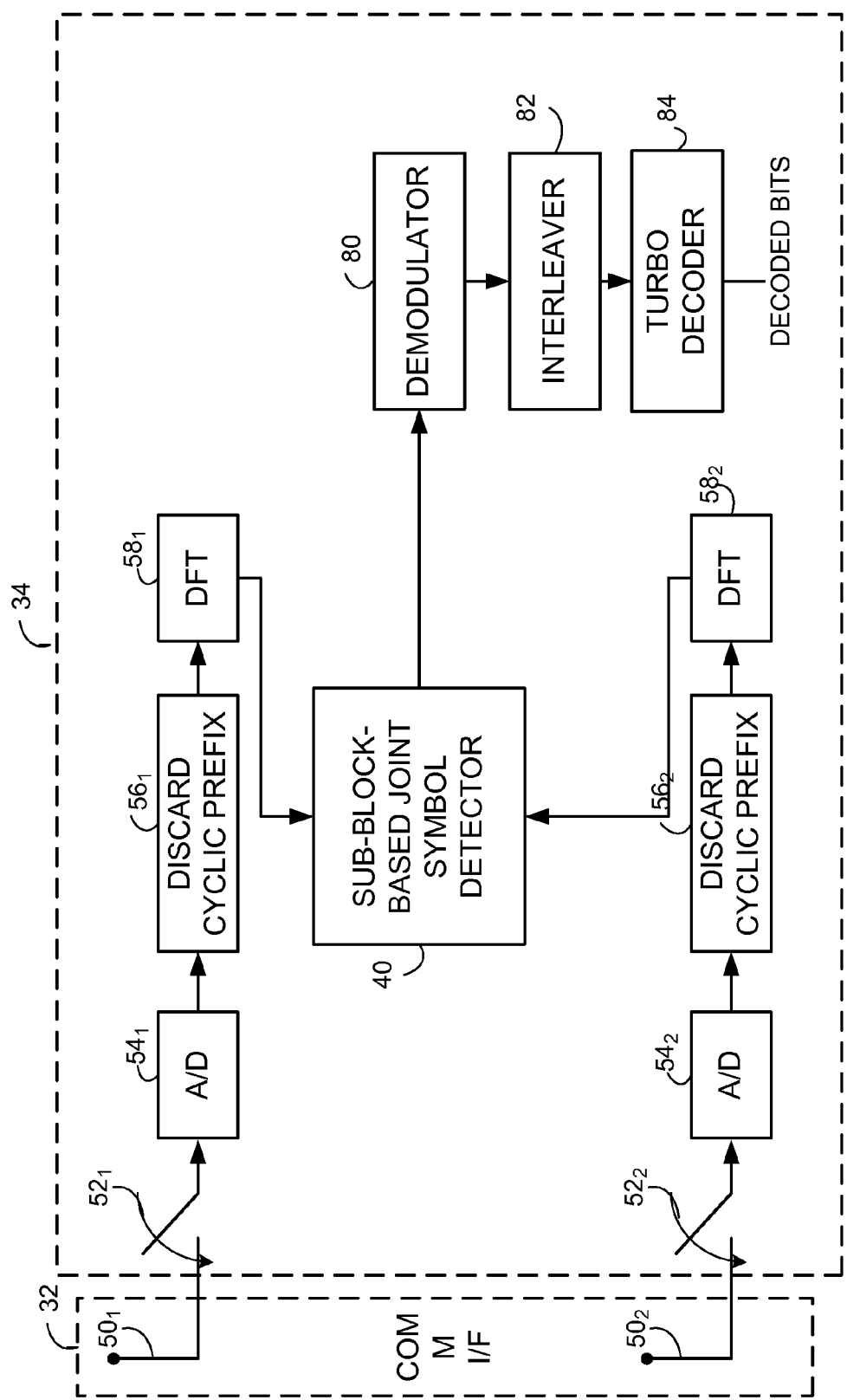
FIG. 5 is a schematic view of selected basic functionalities of a receiver according to an example embodiment.

FIG. 5 shows, in more detail, an example embodiment of receiver 30 which includes symbol detector 40 configured to addresses the problem of inter-symbol interference (ISI) by joint detection of symbols on a sub-block basis. FIG. 5 shows communication interface 32 as comprising plural receive antennas 50 which receive time domain signal waveforms on the subcarriers transmitted by transmitter 28. The FIG. 5 embodiment particularly shows two receive antennas $50_1$ and $50_2$, but it should be understood that a greater number of receive antennas may be employed. The waveforms as received by the receive antennas $50_1$ and $50_2$ are applied to respective front end processing branches of signal processing section 34. Each front end processing channel comprises signal sampler 52; analog to digital converter (ADC) 54; cyclic prefix discard mechanism 56; and, discrete Fourier transform (DFT) 58. It should be appreciated that the number of front end processing branches of signal processing section 34 corresponds to the number of receive antennas 50, so that should a greater number of receive antennas be employed (e.g., four), a corresponding greater number of front end processing branches (e.g., four) are included in signal processing section 34.

Figure 6:
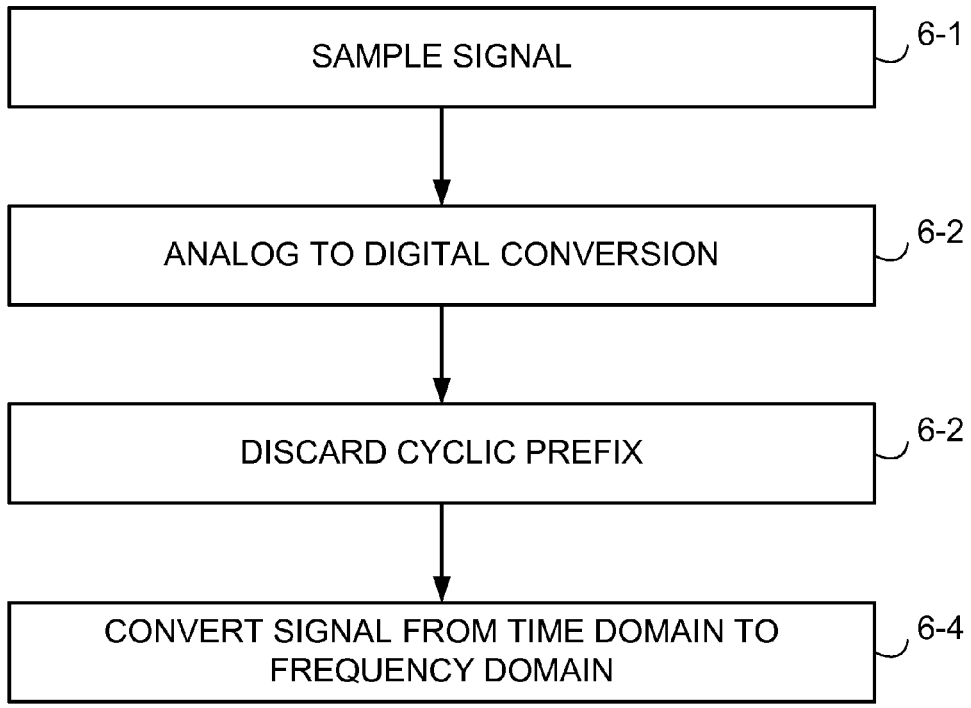
FIG. 6 is a flowchart showing basic, representative acts or steps performed by a front end processing section of a receiver in an example mode.

Basic acts encompassed by operation of portions of the front end processing branches of signal processing section 34 are depicted by FIG. 6. Act 6-1 of FIG. 6 shows the waveforms as received by the receive antennas $50_1$ and $50_2$ as being sampled by respective signal samplers $52_1$ and $52_2$, so that the values corresponding to the sampled discrete points of the waveform are applied to respective analog to digital converters (ADC) $54_1$ and $54_2$. Act 6-2 comprises the sampled discrete points of the waveform being converted from analog to digital by converters (ADC) $54_1$ and $54_2$. As act 6-3 the sampled points corresponding to the cyclic prefix (which was applied by cyclic prefix adder 46 of transmitter 28) are removed by respective cyclic prefix discard mechanisms $56_1$ and $56_2$. Thereafter the discrete-time series of the time domain signal being processed by each branch of the signal processing section 34 is applied to respective Discrete Fourier transform [DFT] (or Fast Fourier transform [FFT]) $58_1$ and $58_2$ so that (as act 6-4) the time domain received signals are converted to the frequency domain. The size of Discrete Fourier transform (or Fast Fourier transform), denoted as N, used by $58_1$ and $58_2$ is determined by the number of samples after discarding the cyclic prefix. Typically, $N \geq K$. Recall that K is the number of subcarriers allocated to the user of interest. Thus, the output ports of $58_1$ and $58_2$ may contain subcarrier signals outside of the frequency allocation of the user of interest. In such cases, those subcarriers outside of the frequency allocation are discarded. Thereafter the frequency domain received signal corresponding to the K subcarriers allocated to the user of interest from each front end processing channel of signal processing section 34 are applied to symbol detector 40.

Stating some of the foregoing in a slightly different way, the sub-block-based joint symbol detector 40 receives from the front end processing section the frequency domain received signal for a particular user, i.e., the "user of interest". The frequency domain received signal for the particular user is obtained from the K number of subcarriers that were actually allocated to the particular user for a particular time slot. The number of subcarriers N handled by the DFT (or FFT) $58_1$ and $58_2$ may be larger than the K number of subcarriers allocated to the user, e.g., may span a bandwidth wider than the bandwidth that is allocated to a user. But the K number of subcarriers provided to the symbol detector 40 comprise the set of subcarriers which were actually allocated to the particular user (user of interest) for a scheduled time period.

Assuming that the cyclic prefix is longer than the multipath delay spread, due to the periodicity of x(t) (see Expression 3), the frequency domain (FD) received signal as received by symbol detector 40 from each front end processing channel can be represented by Expression 4. In Expression 4, index k identifies signals at the kth frequency component (subcarrier), Y(k) is frequency domain (FD) received signal; H(k) is the frequency response; and U(k) is the impairment component (e.g., noise). Here Y(k), H(k), and U(k) are represented as vectors to model the cases with multiple receive antennas, with each element in these vectors corresponding to one receive antenna. For example, the first element of Y(k) is taken from the $k^{th}$ element of the output of discrete Fourier transform (or fast Fourier transform) $58_1$, the second element of Y(k) is taken from the $k^{th}$ element of the output of discrete Fourier transform (or fast Fourier transform) $58_2$, and so on.

$$Y(k)=H(k)S(k)+U(k) \qquad \text{Expression 4}$$

Figure 7:
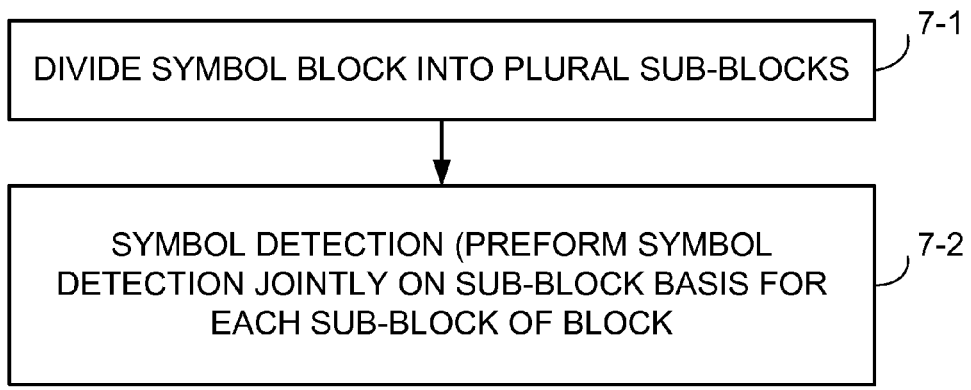
FIG. 7 is a flowchart showing basic, representative acts or steps performed by a symbol detector of a receiver in an example mode.

Basic representative acts performed by symbol detector 40 are shown in FIG. 7. Act 7-1 comprises dividing the block received from the transmitter into sub-blocks (e.g., in the manner of FIG. 2). Act 7-2 comprises the actual symbol detection, which includes symbol detection jointly on a sub-block basis for each sub-block of the block. Example structure of symbol detector 40 employed to perform these basic acts is illustrated in FIG. 8; more detailed acts involved in the symbol detection performed by symbol detector 40 are illustrated in FIG. 9.

Figure 8:
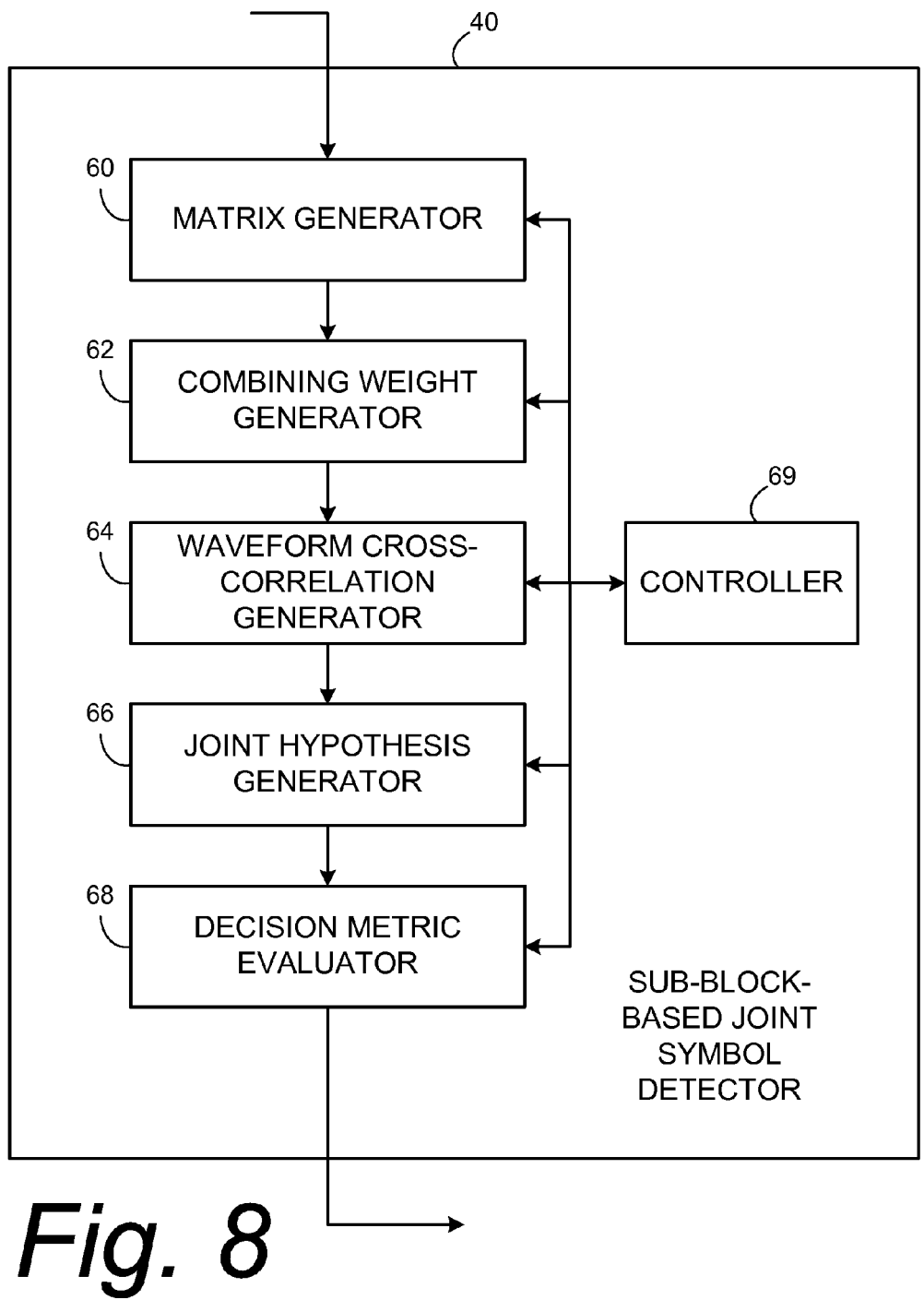
FIG. 8 is a schematic view of selected basic functionalities of a symbol detector according to an example embodiment.

FIG. 8 shows an example embodiment of symbol detector 40 as further comprising matrix generator 60; combining weight generator 62; waveform cross-correlation generator 64; joint hypothesis generator 66; decision metric evaluator 68; and symbol detector controller 69. The operation of each of the generators and the evaluator of symbol detector 40 are supervised and sequenced by symbol detector controller 69, in a manner understood from the operation described below and with reference to the acts of FIG. 9. It will be appreciated that the electronic circuitry that serves as, e.g., or is comprised of, the symbol detector may also serve as the generators and the evaluator of FIG. 8.

Figure 9:
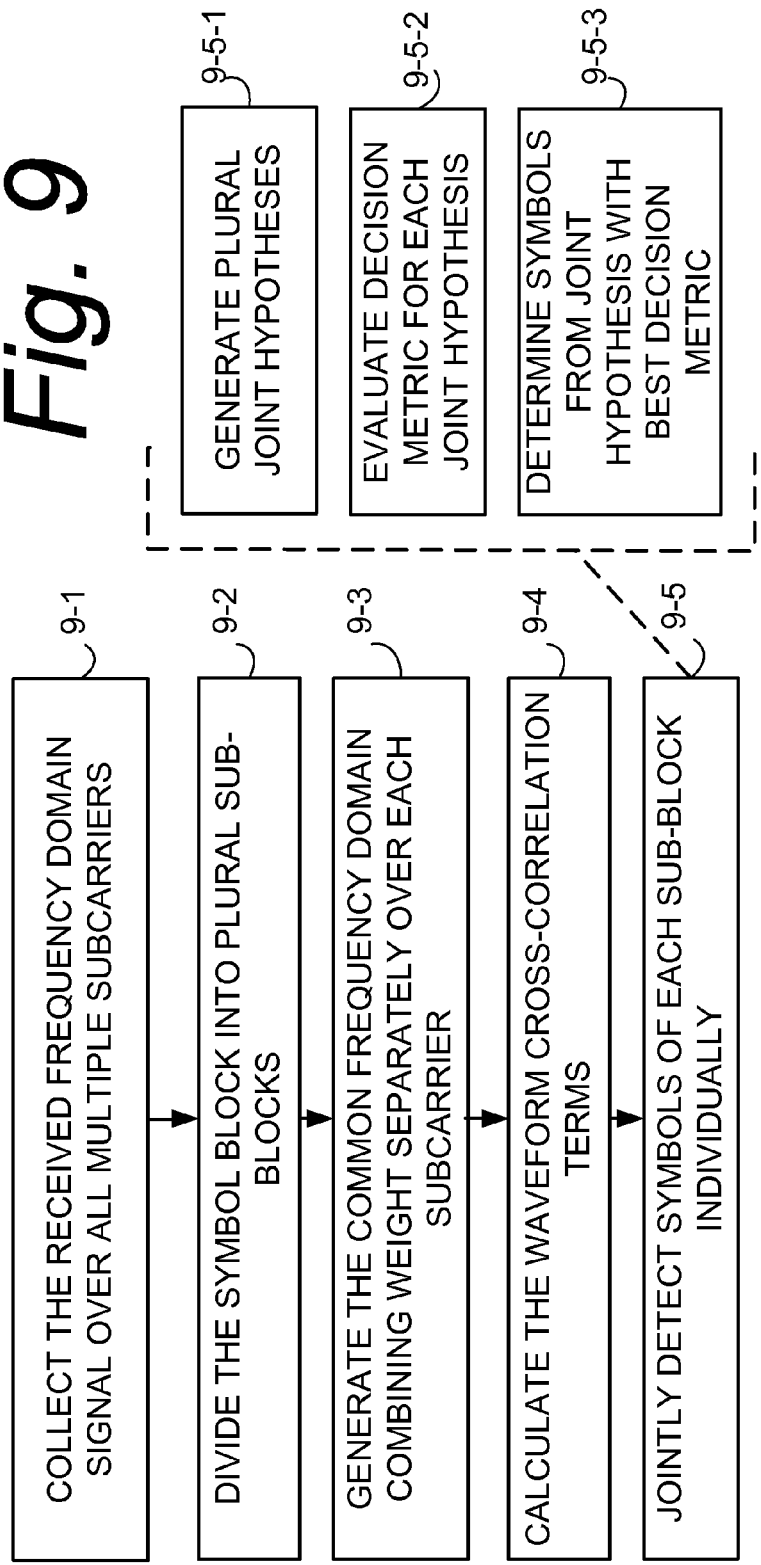
FIG. 9 is a flowchart showing basic, representative symbol detection acts of steps performed by a receiver in an example mode

FIG. 9 illustrates example acts performed by symbol detector 40 in performing a sub-block-based symbol detection procedure. As understood from Expression 4, the receiver antenna signals from multiple receive antennas 50 have already been processed together to form the vector Y(k). Act 9-1 of the sub-block-based symbol detection procedure comprises collecting the received frequency domain signal over multiple (e.g., all) subcarriers. In collecting the received frequency domain signal over multiple subcarriers, symbol detector 40 has access to the total frequency domain received signal Y. The act (9-1) of collecting signals corresponding to the multiple subcarriers into vectors or matrices, e.g., $Y=(Y^T(0), Y^T(1), \ldots, Y^T(K-1))^T$, where K is the number of frequency subcarriers allocated to the user of interest, yields Expression 5.

$$Y=HS+U \qquad \text{Expression 5}$$

In Expression 5, $H=\text{diag}(H(0), H(1), \ldots, H(K-1))$, and $U=(U^T(0), U^T(1), \ldots, U^T(K-1))$. Recall that H is the frequency response and U is the impairment component. In the discussion below, a shorthand notation $\text{diag}_{k=0}^{K-1}(H(k))$ is used to represent the block-diagonal matrix $\text{diag}(H(0), H(1), \ldots, H(K-1))$.

Replacing frequency domain (FD) symbols with time domain (TD) symbols, the frequency domain (FD) received signal can be expressed with time domain symbols as Expression 6, which in turn can be rewritten as Expression 7.

$$Y = HFs + U \qquad \text{Expression 6}$$

$$Y = \sum_{k=0}^{K-1} a(k)s(k) + U \qquad \text{Expression 7}$$

In Expression 7, a(k) is the kth column of matrix HF, which has the form of Expression 7A.

$$a(k)=(f_{0,k}H^T(0), f_{1,k}H^T(1), \ldots, f_{K-1,k}H^T(K-1))^T \qquad \text{Expression 7A}$$

Expression 7A, i.e., a(k), can be thought of as the frequency domain (FD) symbol waveform of s(k). The superscript "T" in Expression 7A (and other expressions herein) is the conventional notation for Transpose, while the superscript "H" in various expressions is the conventional notation for complex conjugate transpose. Use of vector and matrix representation makes it easier to describe certain signal processing acts mathematically.

Returning to the expressions for the frequency domain (FD) received signal, if the channel 29 were "flat", e.g., H(0)= H(1)= . . . =H(K−1), and if E[UU$^H$]=NI, where I is an identity matrix, then it can be shown that the TD symbol s(k) can be recovered by $$\hat{s}(k) = a^H(k)Y = \sum_{k=0}^{K-1} |H(k)|^2 s(k) + a^H(k)U.$$

In such situation ŝ(k) is essentially inter-symbol interference (ISI) free.

In contrast to flat channels, inter-symbol interference (ISI) does occur in frequency-selective fading channels due to the cross-correlation of a(k). As explained below, in a frequency-selective fading case a sub-block equalization procedure or feature of the technology disclosed herein can be used to alleviate inter-symbol interference (ISI). The sub-block equalization is particularly useful, in example, non-limiting mode, on the uplink in Long Term Evolution (LTE) radio access technology, e.g., transmissions from a wireless terminal or UE to a base station node (eNodeB). Sub-block equalization in general is understood from, e.g., Bottomly, Gregory E., and Wang, Y.-P. Eric, "Subblock Equalization and Code Averaging for DS-CMDA Receivers, *IEEE Transactions on Vehicular Technology*, Vol. 59, No. 7, September 2010, pages 3321-3331, which is incorporated herein by reference in its entirety.

As mentioned before, the entire symbol block is too large for all symbols of the block to be detected jointly. Accordingly, act 9-2 of the sub-block-based symbol detection procedure of FIG. 9 comprises dividing the symbol block into plural sub-blocks. Act 9-2 thus also represents act 7-1 of the general procedure of FIG. 7. The receiver 30 determines how it will divide the symbol block, e.g., determines the number of sub-blocks. The receiver 30 need not communicate the number of sub-blocks included in the symbol block to transmitter 28, since transmitter 28 is essentially oblivious to the sub-block-based symbol detection procedure. The transmitter 28 always sees the K number of symbols. Insofar as the sub-block-based symbol detection procedure is concerned, the transmitter 28 and receiver 30 need to agree upon the K value shown in FIG. 4, i.e., the size of the symbol block. Thus receiver 30 has the freedom to choose the number of sub-blocks to be carved out of a symbol block.

As previously mentioned, FIG. 2 shows an example situation in which the receiver 30 has divided a symbol block into two sub-blocks, e.g., sub-block 0 and sub-block 1. For the example of FIG. 2, each of sub-block 0 and sub-block 1 comprises four time-domain symbols. For another situation or embodiment each sub-block may comprise a different (e.g., lesser or greater) number of time-domain symbols, depending on how receiver 30 divides its symbol block into sub-blocks.

An eventual objective of the sub-block-based symbol detection procedure of FIG. 9 is performance of act 9-5, e.g., jointly detecting the symbols of each sub-block on a sub-block basis. In act 9-5 the symbols within each sub-block are detected jointly, but symbols outside the sub-block are treated as noise. For example, with reference to the two sub-block example scenario of FIG. 2, the symbols within sub-block 0 are detected jointly, but symbols outside the sub-block (e.g., the symbols of sub-block 1) are treated as noise. When it is time to detect the symbols of sub-block 1, the symbols within sub-block 1 are detected jointly, but symbols outside the sub-block (e.g., the symbols of sub-block 0) are treated as noise.

For elaborating the above, and without loss of generality, assume that symbols s(0), s(1), . . . , s(K$_0$−1) are the symbols in the sub-block of interest. These symbols are jointly detected, whereas all the other symbols are treated as interference. Expressions for frequency domain (FD) sub-block equalization using the total frequency domain (FD) received signal Y are developed below.

The act of jointly detecting s(0), s(1), . . . , s(K$_0$−1) (e.g., act 9-5) is shown in more detail in FIG. 9 as comprising several sub-acts 9-5-1 through 9-5-3. The sub-acts 9-5-1 through 9-5-3 are performed separately for each sub-block of the symbol block. Act 9-5-1 comprises forming or generating a number of joint hypotheses (e.g., plural joint hypotheses or candidate symbol values). In the example structural embodiment of FIG. 8 the plural joint hypotheses are formed by the joint hypothesis generator 66. If each of the symbols s(0), s(1), . . . , s(K$_0$−1) has Q constellation points (or Q possible values), then there are $Q^{K_0}$ joint hypotheses to be evaluated. For each joint hypothesis developed in act 9-5-1, a decision metric is evaluated as act 9-5-2. The decision metric is of the form of Expression 9, provided below. Act 9-5-3 comprises determining the symbols of the sub-block by using symbols of the one joint hypothesis that had the best metric evaluation in act 9-5-2.

As mentioned above, the decision metric employed in act 9-5-2 of the sub-block-based symbol detection procedure involves evaluation of Expression 9.

$$M(s(0), s(1), \ldots s(K_0 - 1)) = \quad \text{Expression 9}$$
$$-\sum_{k=0}^{K_0-1} |s(k)|^2 a^H(k)R^{-1}a(k) + 2\sum_{k=0}^{K_0-1} \text{Re}\{s^*(k)(R^{-1}a(k))^H Y\} -$$
$$2\sum_{k=0}^{K_0-1} \sum_{j=0, j\neq k}^{K_0-1} \text{Re}\{s(k)s^*(j)a^H(j)R^{-1}a(k)\}$$

Expression 10 explains the impairment covariance matrix R term of Expression 9.

$$R = E\left[\left(\sum_{k=K_0}^{K-1} a(k)s(k) + U\right)\left(\sum_{k=K_0}^{K-1} a(k)s(k) + U\right)^H\right] \quad \text{Expression 10}$$
$$= \text{diag}_{k=0}^{K-1}\left(\frac{K-K_0}{K}H(k)H^H(k) + R_U(k)\right)$$

Expression 10A in turn explains a spatial correlation R$_U$(k) term of Expression 10 for subcarrier k.

$$R_U(k) = E[U(k)U^H(k)] \quad \text{Expression 10A}$$

As implied in Expression (10), the contribution from symbols outside of the sub-block of interest (i.e. symbols s(K$_0$), s(K$_0$+1), . . . , s(K−1)) are folded into the impairment term. Such contribution is captured through the term $$\left(\frac{K-K_0}{K}H(k)H^H(k)\right)$$

in Expression 10. For constant envelope modulation, the first term on the right-hand side of Expression 9 can be omitted.

As one aspect of the technology disclosed herein, the decision metric expression (e.g., Expression 9) is simplified using other convenient expressions. For example, using the diagonal property of total impairment covariance matrix R, the terms in the decision metric can be simplified with the aid of a waveform cross-correlation expression (Expression 11) and a waveform/received signal correlation (Expression 12).

$$a^H(i)R^{-1}a(j) = \sum_{k=0}^{K-1} H^H(k)\left(\frac{K-K_0}{K}H(k)H^H(k) + R_U(k)\right)^{-1}H(k)f_{k,i}^*f_{k,j},$$ Expression 11

$$(R^{-1}a(j))^H Y = \sum_{k=0}^{K-1} f_{k,j}^* H^H(k)\left(\frac{K-K_0}{K}H(k)H^H(k) + R_U(k)\right)^{-1}Y(k)$$ Expression 12

Expression 12A below defines what is herein referred to as a combining weight. The combining weight of Expression 12A has an averaging effect, as exemplified by the $(K-K_0)/K$ term in the sense that the effect of specific waveform $a(k)$, which is dependent of symbol index k, is averaged out, and thus as a result this final expression $(K-K_0)/K$ is independent of symbol index k. The coefficients of Expression 12A are commonly present in both Expression 11 and Expression 12. The combining weight of Expression 12A depends on the spatial correlation $R_U$ of Expression 10A. Moreover, Expression 12A is independent of symbol index and thus independent of sub-block as well.

$$W(k) = \left(\frac{K-K_0}{K}H(k)H^H(k) + R_U(k)\right)^{-1}H(k)$$ Expression 12A These coefficients (weights) of Expression 12A can be thought as frequency domain (FD) equalization weights or combining weights, and may be (preferably are) shared between different sub-blocks. These combining weights are used to combine the frequency domain received signal from multiple receive antennas corresponding to subcarrier k. Note that the coefficients (weights) of Expression 12 contain the term $$\left(\frac{K-K_0}{K}H(k)H^H(k)\right),$$

which (as mentioned earlier) captures the contribution from symbols outside of the sub-block of interest. As such, the interference from symbols outside of the sub-block of interest can be linearly suppressed by formulating proper combining weights. Using Expression 12A, Expression 11 and Expression 12 can be simplified to Expression 13 and Expression 14, respectively.

$$a^H(i)R^{-1}a(j) = \sum_{k=0}^{K-1} W^H(k)H(k)f_{k,i}^*f_{k,j},$$ Expression 13

$$(R^{-1}a(j))^H Y = \sum_{k=0}^{K-1} f_{k,j}^* W^H(k)Y(k)$$ Expression 14

Furthermore, the whole sequence of $(R^{-1}a(j))^H Y$, j=0, 1, ... K−1, can be obtained by taking the inverse DFT of the sequence $W^H(k)Y(k)$, k=0, 1, ... K−1. Thus, the correlation with the total frequency domain received signal Y can be done by first linearly equalizing the received signal in the frequency domain on a subcarrrier-by-subcarrier basis. The act of frequency domain linear equalization is done by processing each subcarrier received signal Y(k) using combining (equalization) weights W(k) to obtained a FD equalized received signal $\tilde{Y}(k) = W^H(k)Y(k)$. Collecting the frequency domain equalized received signal over all subcarriers and applying an inverse DFT operation can produce the entire series of received signal correlation as shown in Expression 15.

$$\begin{bmatrix} (R^{-1}a(0))^H Y \\ (R^{-1}a(1))^H Y \\ \vdots \\ (R^{-1}a(K-1))^H Y \end{bmatrix} = F^H \begin{bmatrix} \tilde{Y}(0) \\ \tilde{Y}(1) \\ \vdots \\ \tilde{Y}(K-1) \end{bmatrix}.$$ Expression 15

In Expression 15, the matrix on the left of the equality is the time domain equalized received signal; $F^H$ represents the inverse DFT operation which operates on the frequency domain equalized signal $\tilde{Y}(k) = W^H(k)Y(k)$. As such, the process of calculating the correlation with the total frequency domain received signal can be broken down into frequency domain equalizing each subcarrier received signal individually. Furthermore, since the correlation with the total frequency domain received signal is determined by the linearly equalized received signal, the act of joint detection of 9-5 basically utilizes waveform crosscorrelations and the linearly equalized received signal.

Expression 12A with its combining weight determination thus serves to simplify the calculation of waveform cross-correlation expressions and waveform/received signal correlations, and in turn Expression 13 and Expression 14 aid in the evaluation of the decision metric of Expression 9. Note again that the combining weight of Expression 12A depends on the spatial correlation $R_U(k)$ of Expression 10A.

The assistance and simplification provided by the combining weight Expression 12A and the waveform cross-correlation Expression 13 help explain acts 9-3 and 9-4 of the sub-block-based symbol detection procedure of FIG. 9. Since act 9-3 and act 9-4 serve to simplify the computations/determinations of the joint detection act 9-5, act 9-3 and act 9-4 are performed before act 9-5.

Act 9-3 comprises generating a common frequency domain combining weight over each subcarrier of the symbol block, e.g., over subcarriers k=0, 2, ... K−1. The common frequency domain combining weight is generated using Expression 12A.

For example, a first combining weight W(0) is computed for a first subcarrier k=0; a combining weight W(1) is computed for a second subcarrier k=1, and so forth up to subcarrier k=K−1. Thus, the combining weight is calculated separately for each subcarrier of the frequency allocation. In being a "common" combining weight, the combining weight computed for a particular subcarrier can be used for performing symbol detection for all sub-blocks of the symbol block. By determining the combining weight before evaluation of a decision metric for any sub-block, the decision metric evaluation can be simplified in that, e.g., the combining weights for a particular subcarrier are re-usable for each sub-block as the sub-block-based symbol detection procedure subsequently separately processes each sub-block of the symbol block.

Act 9-4 comprises calculating the waveform cross-correlation terms that may be shared by one or more of the plural joint hypotheses generated in sub-act 9-5-1. Calculating these waveform cross-correlation terms in advance facilitates repeated use of these terms without having to re-calculate the terms as and whenever they may appear in the plural joint hypotheses. For example, if symbols $s(0), s(1), \ldots, s(K_0-1)$ form the first sub-bock, then only waveform cross-correlation terms such as $a^H(0)R^{-1}a(0)$, $a^H(0)R^{-1}a(1)$, ..., and $a^H(0)R^{-1}a(K_0-1)$ are needed. (For example, $a^H(1)R^{-1}a(3)$ has the same value as does $a^H(0)R^{-1}a(2)$). Note also that the waveform cross-correlation $a^H(i)\ R^{-1}a(j)=a^H((i+m)_K)R^{-1}a((j+m)_K)$ for any arbitrary integer m. Here $(i+m)_K$ is the remainder of $(i+m)$ divided by K, which is in essence an index corresponding to a right circular shift of m from an index i.

Having generated the common combining weights W in act 9-3, and having calculated the waveform cross-correlation terms in act 9-4, the sub-block-based symbol detection procedure can then begin its joint detection act 9-5. The symbols of each sub-block are jointly detected, with other symbols of the sub-block being treated as interference. Of course, as explained above, the other symbols of the sub-block used in act 9-3 to generate the common combining weights and in act 9-4 to calculate the waveform cross-correlation terms.

As mentioned above, joint detection act 9-5 comprises a set of sub-acts 9-5-1 through 9-5-3. Each of the sub-acts 9-5-1 through 9-5-3 of the set is performed for each sub-block. In other words, a first execution or first set of sub-acts 9-5-1 through 9-5-3 is performed for sub-block 0 of FIG. 2 and a separate second execution or second set of sub-acts 9-5-1 through 9-5-3 is performed for sub-block 1 of FIG. 2. If the symbol block of FIG. 2 had been divided into more than two sub-blocks, then the more than two sets of sub-acts would be performed.

As previously explained act 9-5-1 comprises forming or generating a number of joint hypotheses (e.g., plural joint hypotheses or candidate symbol values) for the symbols of a sub-block. The number of joint hypotheses depends, for example, on the number of symbols in the sub-block and the technique employed to modulate the received signal, e.g., the number of Q constellation points. That is, each symbol may have any one of a set of possible values, the set being defined by the modulation constellation used to form the symbols. Then, as act 9-5-2, a decision metric is evaluated for each joint hypothesis developed in act 9-5-1. The decision metric is of the form of Expression 9. Evaluation of Expression 9 is aided by the already-calculated common combining weights (which were determined for each subcarrier of the entire frequency allocation as act 9-3 using Expressions 12A, 13, and 14). Act 9-5-3 comprises determining the symbols of the sub-block by using the one joint hypothesis that had the best metric evaluation in act 9-5-2. In other words, when the best joint hypothesis is determined (i.e., the joint hypothesis that had the best metric evaluation), the symbols of the sub-block being detected are assigned values in accordance with how those symbols were expressed in the best joint hypothesis.

Act 9-5 thus involves jointly detecting symbols within the first sub-block. Plural joint hypotheses are generated (sub-act 9-5-1), and for each hypothesis a decision metric is calculated (sub-act 9-5-2) based on the total frequency domain (FD) received signal, combining weights, and waveform cross-correlations. Sub-act 9-5-3 involves identifying the joint hypothesis that has the best (e.g., largest) decision metric, and it is this joint hypothesis with the best decision metric that has the detected symbol values within the sub-block.

The calculation of the decision metric (sub-act 9-5-2) is performed using Expression 9, which is based on the total frequency domain (FD) received signal, the combining weights, and the waveform cross-correlations. As one aspect of the technology disclosed herein, for evaluating or calculating the decision metric in sub-act 9-5-2 the sub-block-based symbol detection procedure exploits the cyclic shift property of waveform cross-correlations to reduce computational complexity. In other words, the sub-block-based symbol detection procedure can minimize the number of waveform cross-correlations that are made by using the cyclic shift property. As noted above, the waveform cross-correlation $a^H(i)R^{-1}a(j)=a^H((i+m)_K)R^{-1}a((j+m)_K)$ for any arbitrary integer m. Here $(i+m)_K$, is the remainder of $(i+m)$ divided by K, which is in essence an index corresponding to a right (or left) circular shift of a positive (or negative) m value from an index i.

The sub-block-based symbol detection procedure thus detects the symbols of each sub-block using act 9-5 (including the sub-acts 9-5-1 through 9-5-3), and thus performs sub-acts 9-5-1 through 9-5-3 separately for each sub-block until all sub-blocks of the symbol block have had their symbols detected. Thereafter, the symbol block is applied to other units of receiver 30 for further processing. FIG. 5 shows that the detected symbol block is applied to demodulator 80; interleaver 82; and turbo decoder 84 before the detected bits are ultimately provided for their intended use, e.g., to an unillustrated application or program or communications service.

As mentioned above, act 9-5-2 comprises evaluating a decision metric for each joint hypothesis developed in act 9-5-1. As an aspect of the technology disclosed herein, the detection metric may be a function of (determined by) the frequency domain equalized signal. In this regard, it should be appreciated that the second term on the right hand side of the detection metric Expression 9 includes $(R^{-1}a(k))^H Y$, which is essentially what is on the left hand side of Expression 15. With the left hand side of Expression 15 being equal to the right hand side of Expression 15, the decision metric of Expression 9 is thus dependent on the right hand side of Expression 15, which is the $W^H(k)Y(k)$ for each subcarrier, e.g., essentially the frequency domain equalized signal $\tilde{Y}(k)= W^H(k)Y(k)$. Moreover, not only may the decision metric be a function of the frequency domain equalized signal, the detection metric may also be a function of the time domain equalized signal (since the left hand side of Expression 15 represents the time domain equalized signal).

It was above mentioned that sub-act 9-5-3 involves identifying the joint hypothesis that has the best decision metric, and it is this joint hypothesis with the best decision metric that has the detected symbol values within the sub-block. What is meant by "best" decision metric depends on the manner in which the detection metric is expressed. In some versions the detection metric may be expressed as a negative version (i.e. the detection metric is no greater than zero), in which case the best joint hypothesis with the best detection metric is that which has a maximum value. In other versions, the detection metric may be expressed as a positive version (i.e. the detection metric is no less than zero), in which case the best joint hypothesis with the best detection metric is that which has a minimum value. The particular detection metric version of Expression 9 happens to be a negative version, so that in the illustrated example the best joint hypothesis is that for which evaluation of the detection metric results in the greatest (maximum) value.

Figure 10:
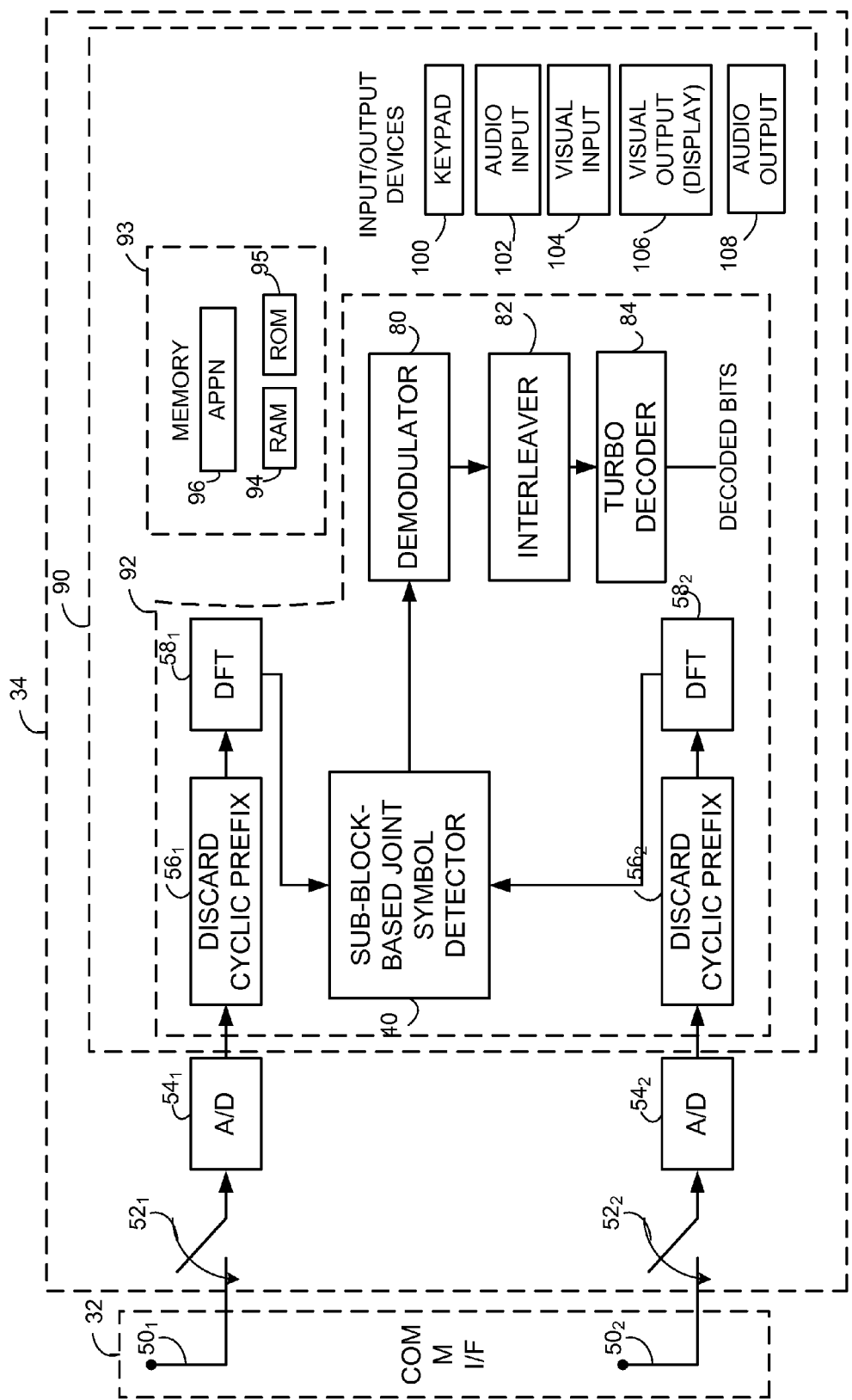
FIG. 10 is a schematic view of selected basic functionalities of a receiver according to an example, machine-implemented embodiment.

FIG. 10 illustrates a non-exhaustive and non-limiting example embodiment of a receiver in which various functional units are provided on a platform 90, the platform 90 being framed by broken lines in FIG. 10. The terminology "platform" is a way of describing how the functional units of receiver 30 can be implemented or realized by machine including electronic circuitry, including the electronic circuitry herein previously described. One example platform 90 is a computer implementation wherein one or more of the framed elements, including symbol detector 40, are realized by one or more processors 92 which execute coded instructions and which use non-transitory signals in order to perform the various acts described herein. In such a computer implementation the receiver 30 can comprise, in addition to a processor(s), memory section 93 (which in turn can comprise random access memory 94; read only memory 95; application memory 96 (which stores, e.g., coded instructions which can be executed by the processor to perform acts described herein); and any other memory such as cache memory, for example.

Typically the platform 90 of receiver 30 also comprises other input/output units or functionalities, some of which are illustrated in FIG. 10, such as keypad 100; audio input device 102 (e.g. microphone); visual input device 104 (e.g., camera); visual output device 106; and audio output device 108 (e.g., speaker). Other types of input/output devices can also be connected to or comprise receiver 30.

In the example of FIG. 10 the platform 90 has been illustrated as computer-implemented or computer-based platforms. Another example platform suitable for base 30 and/or symbol detector 40 in particular is that of a hardware circuit, e.g., an application specific integrated circuit (ASIC) wherein circuit elements are structured and operated to perform the various acts described herein.

Figure 11:
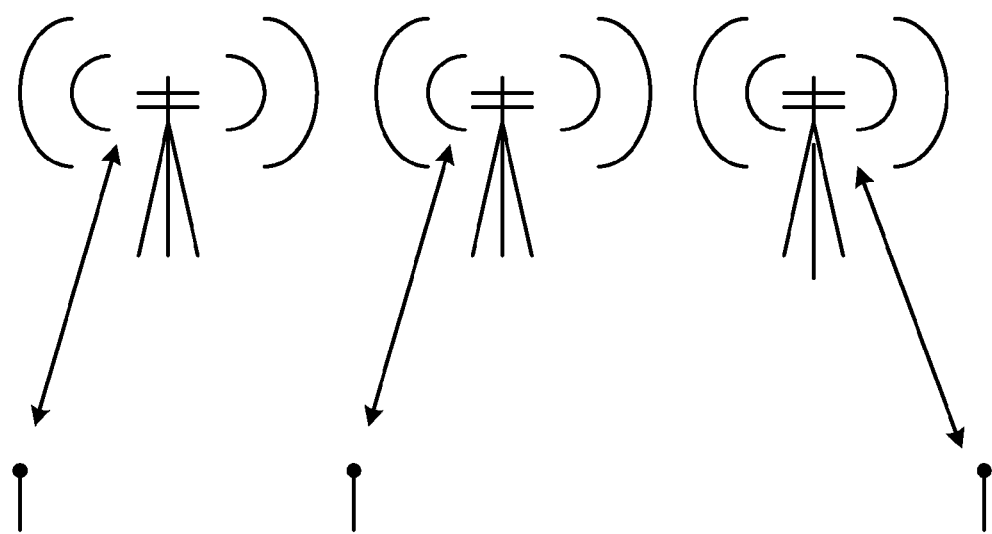
FIG. 11 is a diagrammatic view of portions of a Long Term Evolution (LTE) telecommunications network according to an example embodiment.
Figure 12:
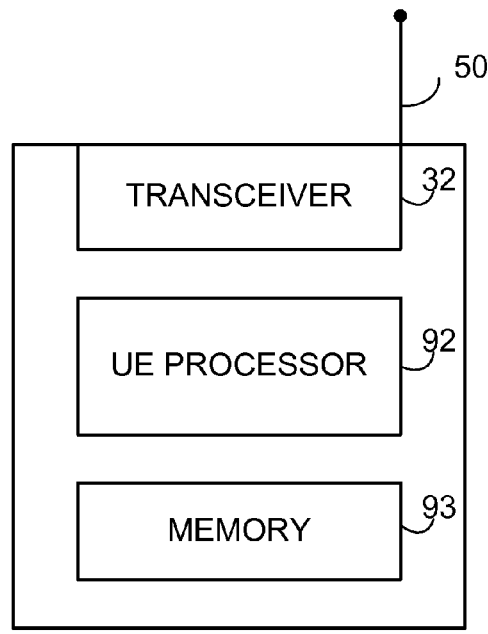
FIG. 12 is a diagrammatic view of portions of a user equipment unit (UE) served by a Long Term Evolution (LTE) telecommunications network according to an example embodiment.

Although the described solutions may be implemented in any appropriate type of telecommunication system supporting any suitable communication standards and using any suitable components, particular embodiments of the described solutions may be implemented in a Long Term Evolution (LTE) network, such as that basically illustrated in FIG. 11. As shown in FIG. 11, the example network may include one or more instances of wireless terminals or user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 12. Similarly, although the illustrated base stations may represent network nodes that include any suitable combination of hardware and/or software, these base stations may, in particular embodiments, represent devices such as the example base station illustrated in greater detail by FIG. 13.

Figure 13:
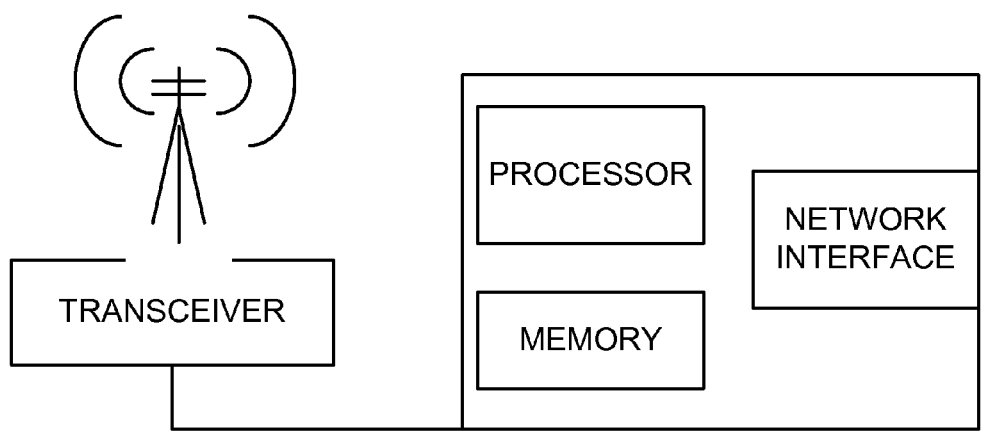
FIG. 13 is a diagrammatic view of portions of a base station node that comprises a Long Term Evolution (LTE) telecommunications network according to an example embodiment.

As shown in FIG. 13, the example UE includes a processor 92, a memory 93, a transceiver 32, and an antenna 50. In particular embodiments, some or all of the steps in the uplink transmission techniques described above may be performed by the UE processor executing instructions stored on a computer-readable medium, such as the memory shown in FIG. 12. Alternative embodiments of the UE may include additional components beyond those shown in FIG. 12 that may be responsible for providing certain aspects of the UE's functionality, including any of the functionality described above and/or any functionality necessary to support the solution described above.

As shown in FIG. 13, the example base station includes a processor, a memory, a transceiver, and an antenna. In particular embodiments, some or all of the steps in the equalization techniques described above may be performed by the base station processor executing instructions stored on a computer-readable medium, such as the memory shown in FIG. 13. Alternative embodiments of the base station may include additional components responsible for providing additional functionality, including any of the functionality identified above and/or any functionality necessary to support the solution described above.

The technology disclosed herein thus provides a technique of sub-block equalization that can be used to improve uplink LTE or HSPA performance. The disclosed sub-block equalization can be considered as a limited form of maximum likelihood (ML) joint detection in the sense that, with the sub-block equalization technique, symbols within the sub-block of interest are detected jointly whereas symbols outside the sub-block are treated as noise. The sub-block equalization of the technology disclosed herein can also be used in a more complex near-ML detector such as multi-stage group detection (MSGD) (also known as assisted maximum-likelihood detection (AMLD)). Certain existing solutions utilize a form of time-domain (TD) sub-block equalization.

In an example implementation frequency-domain (FD) sub-block equalization is utilized for the Long Term Evolution (LTE) uplink. For example, in example implementations the frequency domain (FD) sub-block equalization as described herein or encompassed hereby can be used on Physical Uplink Shared Channel (PUSCH) or Physical Uplink Control Channel (PUCCH). In example implementations described herein, the sub-block includes a subset of symbols that are jointly DFT-precoded. The sub-block equalization technique of the technology disclosed herein can be used as a building block in a more complex near-ML detector.

Advantageously, the technology disclosed herein provides an efficient implementation of frequency-domain (FD) sub-block equalization that reduces computational complexity significantly.

| Abbreviations | |
| --- | --- |
| MLD | maximum-likelihood detection |
| SC-FDMA | single-carrier frequency-division multiple access |
| ISI | inter-symbol interference |
| LMMSE | linear minimum mean square error equalization |
| DFE | decision-feedback equalization |
| MSGD | multi-stage group detection |
| AMLD | assisted maximum-likelihood detection |
| ML | maximum likelihood |
| FD | frequency-domain |
| TD | time-domain |
| LE | linear equalization |
| FD-LE | frequency-domain linear equalization |
| PUSCH | Physical Uplink Shared Channel |
| PUCCH | Physical Uplink Control Channel |

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A receiver configured to perform symbol detection, comprising:
    a plurality of receive antennas operable to receive a frequency domain signal comprising a block of time domain symbols;
    electronic circuitry operable to:
       divide the block of time domain symbols in the received signal into plural sub-blocks;
       for each sub-block, perform a joint detection of the symbols of the sub-block while during the joint detection treating symbols of the block that are outside of the sub-block as noise;
       generate plural joint hypotheses for the time domain symbols in the sub-block;
       perform an evaluation of a decision metric for each of the plural joint hypotheses and to detect correct symbols based on the evaluation of the decision metric;
       determine separately for each subcarrier of the block, a combining weight that is applicable for all the sub-blocks of the block; and
       use the combining weight to perform the evaluation of the decision metric for each subcarrier of the sub-block.

2. The receiver of claim 1, wherein the receiver is a base station and wherein the plural receive antennas are configured to receive the frequency domain signal on an uplink channel.

3. The receiver of claim 2, wherein the uplink channel is at least one of a Physical Uplink Shared Channel (PUSCH) and a Physical Uplink Control Channel (PUCCH).

4. The receiver of claim 1, wherein the electronic circuitry is further operable to use properties related to symbols of the block that are outside of the sub-block for generating the combining weights and configured to use the combining weights for combining plural versions of the received signal at each subcarrier, each version received from a respective one of the plural receive antennas.

5. The receiver of claim 1, wherein the decision metric is a function of a frequency domain equalized signal.

6. The receiver of claim 1, wherein the decision metric is a function of a time domain equalized signal.

7. The receiver of claim 1, wherein the electronic circuitry is further operable to:
    determine, prior to performing the evaluation, waveform cross-correlation terms that are common for performing the evaluation of the decision metric for different sub-blocks; and
    use the waveform cross-correlation terms to perform the evaluation of the decision metric for the plural joint hypotheses.

8. The receiver of claim 7, wherein the electronic circuitry is further operable to perform a cyclical shift of the waveform cross-correlation terms and to use the cyclical shift of the waveform cross-correlation terms to perform the evaluation of the decision metric for the plural joint hypotheses.

9. A receiver configured to perform symbol detection, comprising:
    a plurality of receive antennas operable to receive a frequency domain signal comprising a block of time domain symbols;
    electronic circuitry operable to:
       divide the block of time domain symbols in the received signal into plural sub-blocks;
       for each sub-block, perform a joint detection of the symbols of the sub-block while during the joint detection treating symbols of the block that are outside of the sub-block as noise;
       to use properties related to symbols of the block that are outside of the sub-block for generating combining weights; and configured to use the combining weights for combining plural versions of the received signal at each subcarrier, each version received from a respective one of the plural receive antennas, wherein the properties related to the symbols of the block that are outside of the sub-block comprises frequency characteristics and spatial correlation of the symbols of the block that are outside of the sub-block.

10. A method of operating a wireless receiver comprising:
    receiving a frequency domain received signal that comprises contribution from a block of time domain symbols;
    dividing the block of time domain symbols into plural sub-blocks;
    for each sub-block, performing a joint detection of the symbols of the sub-block while during the joint detection treating symbols of the block that are outside of the sub-block as noise;
    generating plural joint hypotheses for the time domain symbols in the sub-block;
    performing an evaluation of a decision metric for each of the plural joint hypotheses;
    detecting correct symbols based on the evaluation of the decision metric;
    determining separately for each subcarrier of the block a combining weight that is applicable for all the sub-blocks of the block; and
    for each subcarrier using the combining weight to performing the evaluation of the decision metric.

11. The method of claim 10, further comprising transmitting the block on an uplink channel from a wireless terminal to a base station node.

12. The method of claim 11, further comprising transmitting the block on at least one of a Physical Uplink Shared Channel (PUSCH) and a Physical Uplink Control Channel (PUCCH).

13. The method of claim 10, further comprising:
    using properties related to symbols of the block that are outside of the sub-block for generating the combining weights;
    using the combining weights for combining plural versions of the signal of each subcarrier received from respective plural receive antennas.

14. The method of claim 10, further comprising configuring the decision metric as a function of a frequency domain equalized signal.

15. The method of claim 10, further comprising configuring the detection metric as a function of a time domain equalized signal.

16. The method of claim 10, further comprising using the combining weight to combine copies of the signals from plural receive antennas.

17. The method of claim 10, further comprising:
prior to performing the evaluation, determining waveform cross-correlation terms that are common for performing the evaluation of the decision metric for different sub-blocks; and
using the waveform cross-correlation terms to perform the evaluation of the decision metric for the plural joint hypotheses.

18. The method of claim 17, further comprising:
performing a cyclical shift of the waveform cross-correlation terms; and
using the cyclical shift of the waveform cross-correlation terms to perform the evaluation of the decision metric for the plural joint hypotheses.

19. A method of operating a wireless receiver comprising:
receiving a frequency domain received signal that comprises contribution from a block of time domain symbols;
dividing the block of time domain symbols into plural sub-blocks; and
for each sub-block, performing a joint detection of the symbols of the sub-block while during the joint detection treating symbols of the block that are outside of the sub-block as noise;
using properties related to symbols of the block that are outside of the sub-block for generating combining weights; and
using the combining weights for combining plural versions of the signal of each subcarrier received from respective plural receive antennas, wherein the properties related to the symbols of the block that are outside of the sub-block comprise frequency characteristics and spatial correlation of the symbols of the block that are outside of the sub-block.

* * * * *